(12) United States Patent
Song

(10) Patent No.: US 7,428,504 B2
(45) Date of Patent: Sep. 23, 2008

(54) METHOD AND SYSTEM FOR ORGANIZING AND DISSEMINATING INFORMATION ON PRODUCTS FEATURED IN ENTERTAINMENT PRODUCTIONS

(75) Inventor: Michael Kwon Song, Richmond, VA (US)

(73) Assignee: Visure Corporation, Richmond, VA (US)

( * ) Notice: Subject to any disclaimer, the term of this patent is extended or adjusted under 35 U.S.C. 154(b) by 0 days.

(21) Appl. No.: 11/014,454

(22) Filed: Dec. 17, 2004

(65) Prior Publication Data

US 2006/0020523 A1   Jan. 26, 2006

Related U.S. Application Data

(60) Provisional application No. 60/589,018, filed on Jul. 20, 2004.

(51) Int. Cl.
*G06Q 30/00* (2006.01)
(52) U.S. Cl. ............................................ 705/26; 705/14
(58) Field of Classification Search .................. 705/26, 705/27
See application file for complete search history.

(56) References Cited

U.S. PATENT DOCUMENTS

| 6,029,141 | A | * | 2/2000 | Bezos et al. | 705/27 |
|---|---|---|---|---|---|
| 6,160,570 | A | | 12/2000 | Sitnik | |
| 6,360,254 | B1 | * | 3/2002 | Linden et al. | 709/219 |
| 6,438,751 | B1 | | 8/2002 | Voyticky et al. | |
| 6,691,155 | B2 | | 2/2004 | Gottfried | |
| 2002/0046074 | A1 | * | 4/2002 | Barton | 705/8 |
| 2004/0019524 | A1 | | 1/2004 | Marshall | |
| 2005/0021417 | A1 | * | 1/2005 | Kassan | 705/26 |
| 2005/0040230 | A1 | * | 2/2005 | Swartz et al. | 235/383 |

OTHER PUBLICATIONS

Shamdasani et al. "Location, Location, Location: Insights for Advertising Placement on the Web", Journal of Advertising Research Jul.-Aug. 2001. Retrieved from Dialog File: 148, Acc#: 14363258.*

* cited by examiner

*Primary Examiner*—Naeem Haq
(74) *Attorney, Agent, or Firm*—DLA Piper US LLP

(57) ABSTRACT

A method, program product and system for organizing and disseminating information on products featured in entertainment productions. The invention includes a database for storing a catalogue of product information on products featured in entertainment productions. A server is programmed to perform the steps of: authorizing access to the user, accepting a search request from the user, querying the database based on said search request, displaying the products identified from the catalogue on a display screen of a user computer using visual indicators related to entertainment productions, receiving a product selection from said user, and displaying detailed product information on a display screen of a user computer based on the product selection.

54 Claims, 15 Drawing Sheets

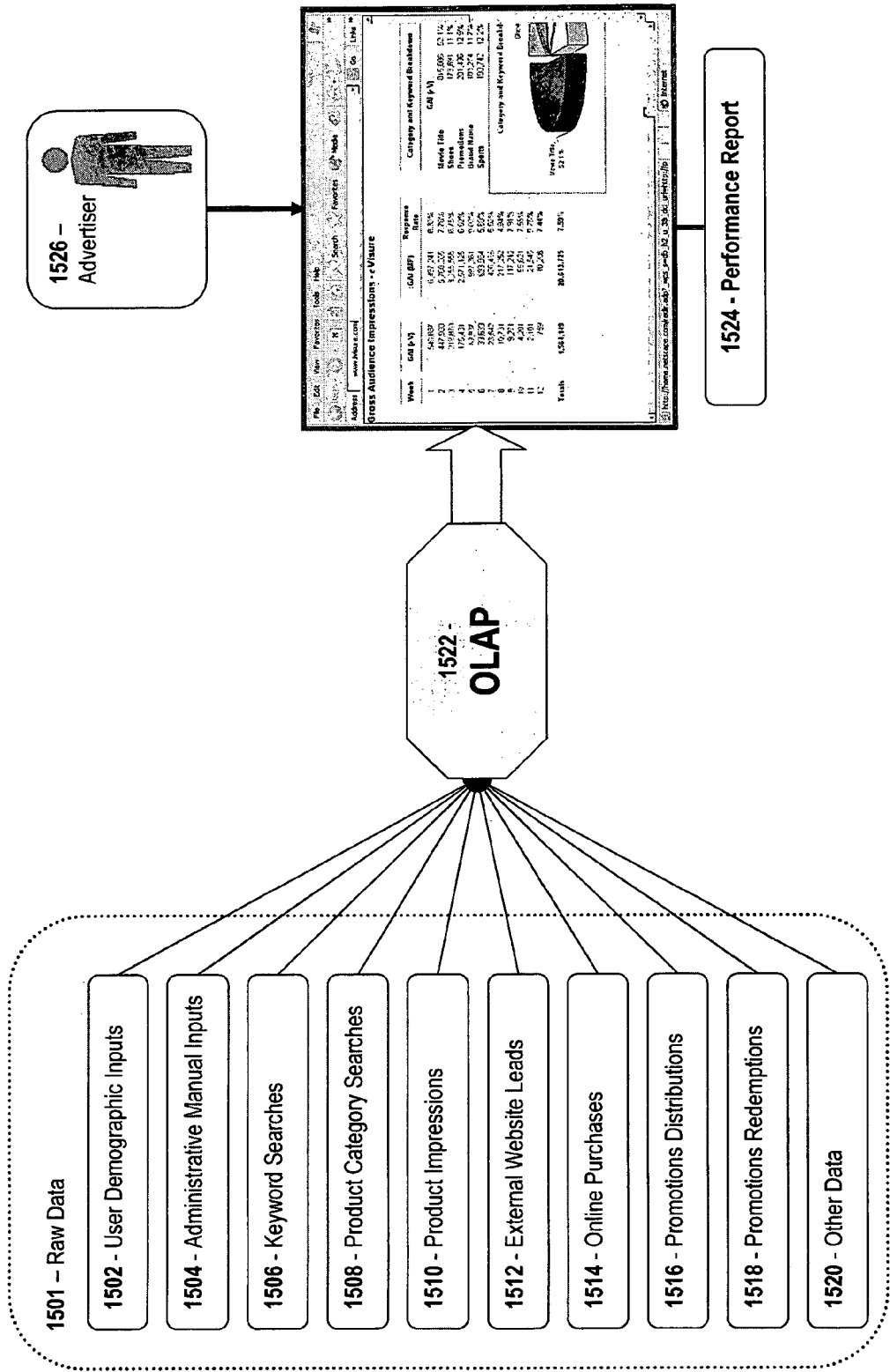

METHOD AND SYSTEM FOR ORGANIZING AND DISSEMINATING INFORMATION ON PRODUCTS FEATURED IN ENTERTAINMENT PRODUCTIONS

CROSS-REFERENCE TO RELATED PATENT APPLICATIONS

This application claims the benefit of priority to U.S. Provisional Patent Application Ser. No. 60/589,018, filed on Jul. 20, 2004, the entire contents of which are incorporated herein by reference.

BACKGROUND OF THE INVENTION

The invention relates generally to the field of product placement, also known as integrated entertainment marketing. Specifically, the invention relates to cataloguing product placements for information presentation, clear identification, direct and indirect purchasing, and measuring marketing performance of products featured in entertainment productions.

Product placement and integrated entertainment marketing is the practice of gaining product (good or service) exposure by physically positioning the product or the product's name in entertainment media, typically a motion picture or television program. The practice also employs other forms of entertainment productions including music, music videos, video games, books and literature, and events. Objects of product placement commonly include props, script elements, set fixtures, set design, wardrobe, costume design, equipment, vehicles and machinery, outdoor signage, production locations, venues, and embedded storyline advertising.

FIG. 1 illustrates various examples of product placement in a single motion picture screen shot 102 such as lamps 104 placed as a prop, the character's dress 106, the character's watch 108, and the stereo 110 used in the scene.

Generally, product placement and entertainment marketing has developed into three categorical levels of degree: Direct Trade, Tie-In or Focused Advertising, and Branded Entertainment Partnership.

Direct Trade

A Direct Trade is the common and traditional form of product placement, and FIG. 2 is an example of a Direct Trade. The product's manufacturer or agent may supply the production with a particular good or service, typically requested by the production company. In this way, the product is given potentially valuable exposure, and the production company reduces its costs of acquiring props, wardrobe, accessories, set elements, and the like. An agreement may even include the product's name in the closing credits. However, a trade agreement does not necessarily guarantee significant, if any, exposure. Exposure may be diminished or completely eliminated from the final edit at the director's discretion. An example of direct trade is illustrated by the product 202 shown in the screen shot of FIG. 2.

Tie-In and Focused Advertising

An upgrade from the Direct Trade product placement is a Tie-In or Focused Advertising campaign, which collaborates objectives of the production and the product brand. FIG. 3 exemplifies a Tie-In support initiative, where the brand implements co-marketing efforts to advertise its product 306 and brand 308 with the production and its proprietary assets, such as the production's logo 302 or certain images 304. These co-marketing tactics often employ traditional media such as television commercials, print, radio, the Web, point-of-purchase displays, etc. This type of agreement reduces marketing costs for the producer, and the manufacturer earns increased control over the product's significance of exposure.

Branded Entertainment Partnership

A heightened level of the Tie-In/Focused advertising agreement is the Branded Entertainment Partnership, exemplified in FIG. 4. A major film production requires tens of millions of dollars to promote a feature, and a marketing partner is a valuable resource for providing that budget. Such partnerships allow the product brand to significantly associate itself with the entertainment brand, even if the product is not used in the entertainment production itself. Agreements may allow the co-marketer further use of entertainment properties such as images, artwork, trademarks, copyrights, etc. to market the product. A Branded Entertainment Partnership may not necessarily entail an actual product placed in the production; however, a product brand may still exploit its entertainment marketing value, as illustrated by the product packaging 402 in FIG. 4.

Product Placement and Integrated Entertainment Marketing Development

The field of product placement and entertainment marketing is a popular marketing initiative, largely due to its jackpot cost structure and its high-profile nature. The field has gained more popularity in the current advertising market due to various trends and industry factors. Traditional advertising in the current media landscape faces some significant challenges. With the issues of clutter and content disruption, advertisers question message effectiveness, delivery, and efficiency. Ads compete with other ads for audience reception, and audiences tend to ignore ads by using remote controls. Furthermore, with the emergence of various ad-skipping technologies (i.e. video-on-demand, TiVo, digital video recorders, XM radio, etc.), advertisers resort to more creative forms of communication. These issues are of utmost concern to marketers across the globe as the cost of traditional media increases. One of the most popular and growing alternatives is product placement, in which the exposure or message is embedded within the entertainment content.

Internet Advertising Development

Advertisers covet the value of the Internet for advertising because the medium is technologically versatile in achieving various marketing objectives. Advertisers have learned how to use techniques only the Web can offer. Some techniques include capturing consumer data, measuring results of advertising campaigns, and tracking paths of consumers from the ads they view to the date and place of purchase.

Problems with Product Placement and Integrated Entertainment Marketing

Product placement offers an alternative to traditional advertising; however, there are trade-offs. And, just as there are complications for advertisers, there are also complications for consumers, retailers of those products, and even the production companies. Those inconsistencies are described below according to each perspective.

The Advertiser Perspective

Clear product or brand identification. Many placements are not clearly visible for audiences to identify the product or the brand, and some placements go even unnoticed. In some cases, the placement may even be excluded from the director's final cut.

Underdeveloped or unplanned advertising messages. Because placements are restricted to the context of the script, it is difficult to plan and deliver a specific message to influence consumer behavior or action.

Investment risk. There is a high level of uncertainty on how much exposure the placement will earn, what kind of consumer recall it will generate, and if it influences purchasing behavior.

No tangible link to consumers. There is no tangible link between on-screen exposure to the end user and consumer response.

Complex and expensive mix of support marketing tools. In order to ensure message delivery, a marketer may supplement the product placement with various support tactics. A support campaign may be as complex and expensive as a traditional marketing communications campaign, implementing marketing tools such as point-of-purchase, Internet, television, print, and radio ads. This mix may even require additional personnel and outsourced agencies. The support campaign not only gets costly, but measuring each tactic gets complicated. Thus, it is difficult to analyze the performance of the product placement itself in comparison to non-product placement marketing tools.

Credibility risk. Brand advertisers risk weakening the link between the product and the production by implementing separate support campaigns. The placement generates the sincere exposure, but the support campaign plays the major marketing communications role. Thus, the consumer may perceive the placement to be insincere or superlative.

Measurement and control. There is no quantifiable return on investment or standard system for measuring the effectiveness of product placement in traditional marketing or business metrics (i.e. Nielsen ratings, effective audience reach, ROI, etc.). Thus, from an advertiser's perspective, it is difficult to justify spending in product placement. In other words, product placement is either an instinctive gamble, or companies use it as a supplement tool in full marketing campaigns.

Retailer Perspective

The marketing nature of product placements remains at the national branding level. From the perspective of retailers and distributors, it is difficult to use the product placement to their advantage.

No product placement to sales correlation. The distributor is unable to relate the product placement to merchandise it carries.

No store traffic generation. There is no proof that the product placement message generates consumer traffic to the distributor.

Consumer identification. There is no way for the distributor to communicate to consumers that it carries the products seen on screen.

No valid measurement. The distributor cannot link sales to the product placement tool for measurement.

Consumer Perspective

While the product placement may spark a consumer's interest, it is extremely difficult for consumers to identify the product for purchasing.

Product identification. It is often difficult for a viewer to clearly identify a featured product or its brand and manufacturer, as exemplified by the Armani dress 202 in FIG. 2.

No response mechanism for product identification. There is no vehicle to fully deliver a message initiated by the product placement, even for proactive consumers.

Fragmented information. If product placement information is available on the Internet, or from another source, the consumer must search various sources to identify the product. Furthermore, even if the consumer does identify the product and its manufacturer, the consumer may then need to do further research to locate a retailer for the product.

Other goods and services. Some goods and services featured in entertainment productions are not necessarily objects of integrated entertainment marketing. For example, a consumer may be interested in attractive tourist sites and events featured in a movie.

Lack of promotional awareness. Often, a brand will offer a promotional tie-in with the placement; however, the promotions may not be efficiently channeled to the consumer, leaving the consumer unaware of promotional benefits.

Production Company Perspective

While product placement is a viable source of supplies and funds for production companies, the production company faces the following concerns:

Compromised content. The producer risks compromising the content's creative and artistic integrity by forcing awkward products on screen.

Credit clutter. Some product placement agreements may include product names in a listing during the closing credits. That listing may become cluttered with a long list of products.

Removal and liquidation. Production companies are burdened with the task of removing products and supplies from the set. Many of those products and supplies may be stored in a warehouse, and that warehousing can become costly. Such burdens may also distract staff from focusing on core production functions.

Negotiating leverage. Without a standard measurement system and a method to ensure product placement effectiveness, production companies may not be able to negotiate sound agreements. A platform and system designed to market and measure featured products offer production companies a method of driving effectiveness and negotiating leverage to attract advertisers, secure product placement partners, and valuate those partnerships.

Some information sources, particularly online sources, may publish information regarding products featured in movies or television. For example, a fashion website may list some fashion-related products featured in movies or television; however, such publications do not comprehensively list various featured products from various product categories.

Some websites designed to promote the motion picture or television program themselves may include or link to some featured product information. Such sites are designed for that particular production, and they do not collaborate and catalogue featured products from multiple productions.

SUMMARY OF THE INVENTION

A method, program product and system for organizing and disseminating information on products featured in entertainment productions. The invention includes a database for storing a catalogue of product information on products featured in entertainment productions. A server is programmed to perform the steps of: authorizing access to the user, accepting a search request from the user, querying the database based on said search request, displaying the products identified from the catalogue on a display screen of a user computer using visual indicators related to entertainment productions, receiving a product selection from said user, and displaying detailed product information on a display screen of a user computer based on the product selection.

According to one aspect of the invention, a consumer may identify a featured product. Upon identifying the product, the consumer may receive detailed product information, such as product attributes and features, product price points, product promotions. The invention may also provide a list of local retailers selling the identified product.

According to another aspect of the invention, a product advertiser employing product placement may support featured product exposure and measure the performance of the product placement. The product placement advertiser may deliver marketing messages via the invention, and the advertiser may evaluate and analyze various levels of consumer response and action related to the product placement.

According to another aspect of the invention, a retailer of a featured product may employ the invention to advertise itself as a reseller of the featured product. A retailer's information may be matched with a featured product and the consumer's location in order to appear on a retailer directory.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention is illustrated by way of example, and not by way of limitation, in the figures of the accompanying drawings and in which like reference numerals refer to similar elements in which:

FIG. 15 conceptually describes the process for capturing various inputs, metrics, invention user activity, and other relevant data to produce performance reports for advertisers.

DETAILED DESCRIPTION OF THE PREFERRED EMBODIMENTS

Figure 1:
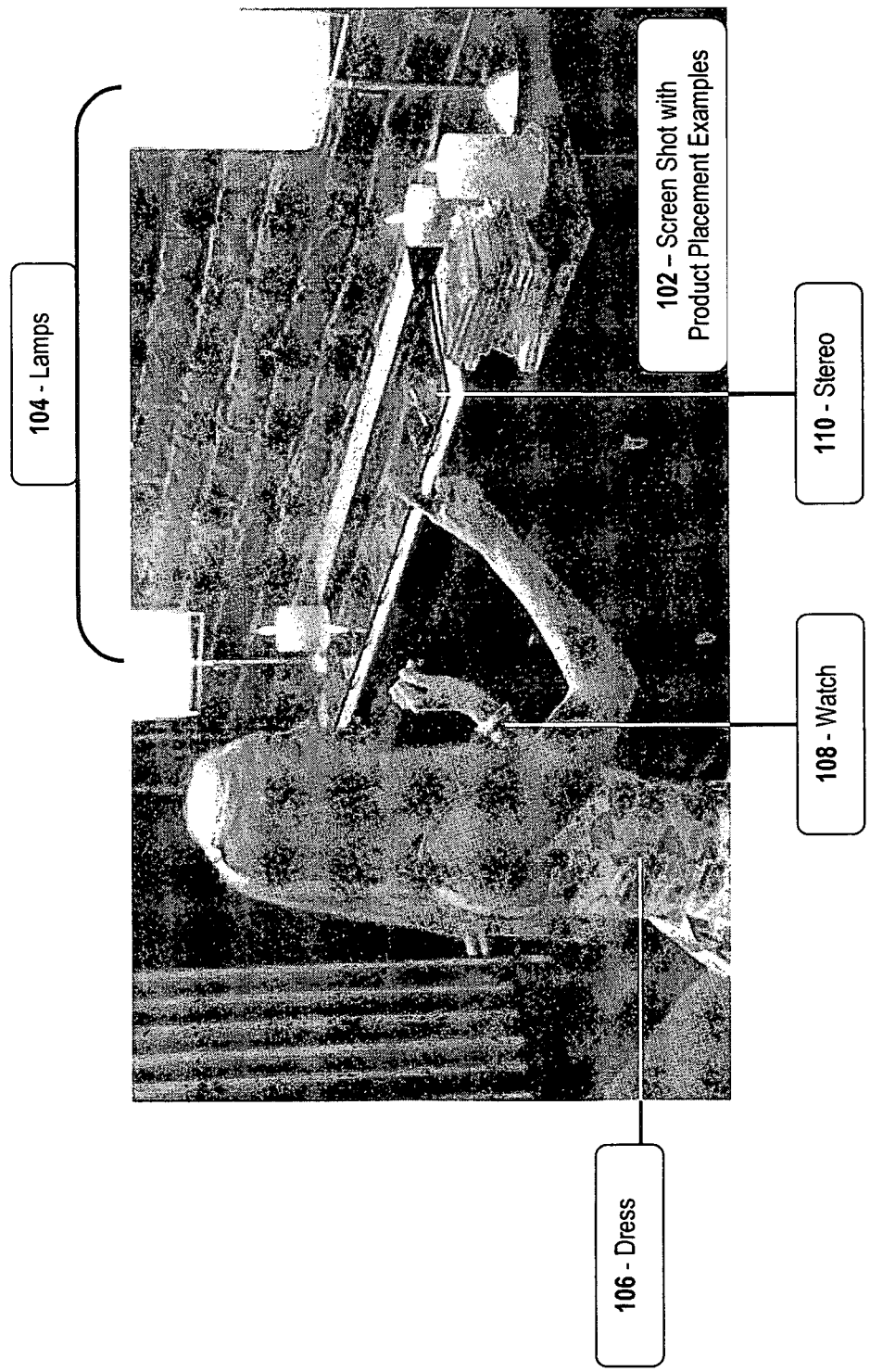
FIG. 1 is an actual motion picture screen shot from a motion picture which provides examples of product placement.
Figure 2:
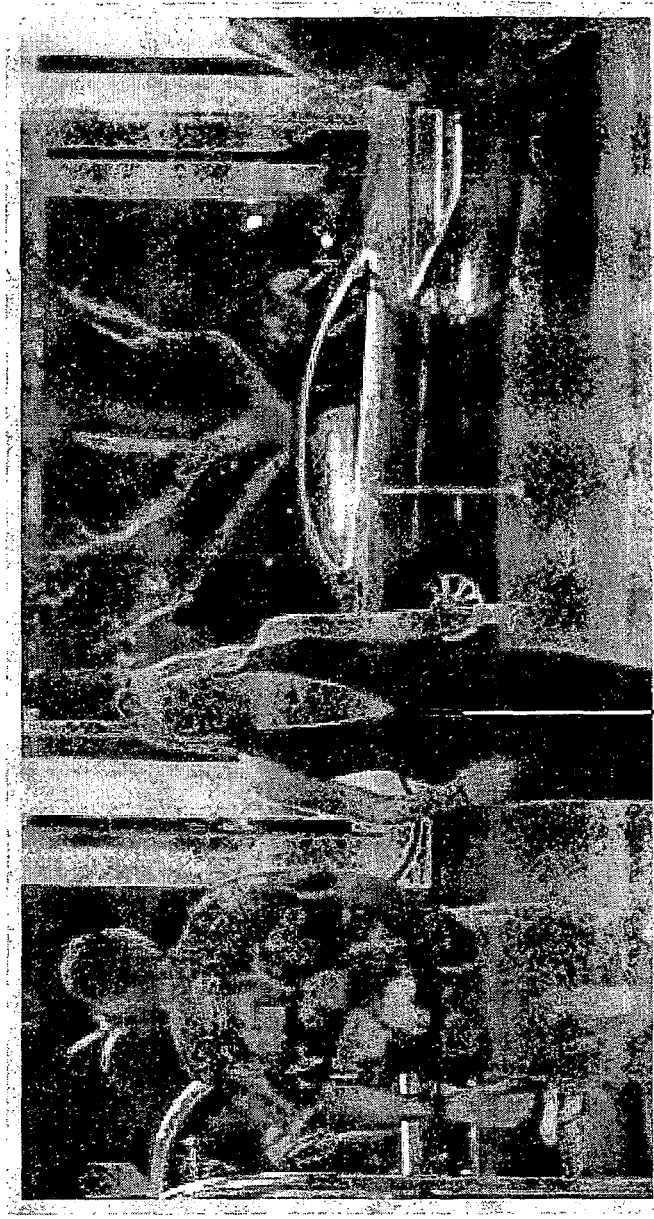
FIG. 2 is an example of a Direct Trade product placement in which the featured product and the manufacturer are unidentifiable.
Figure 3:
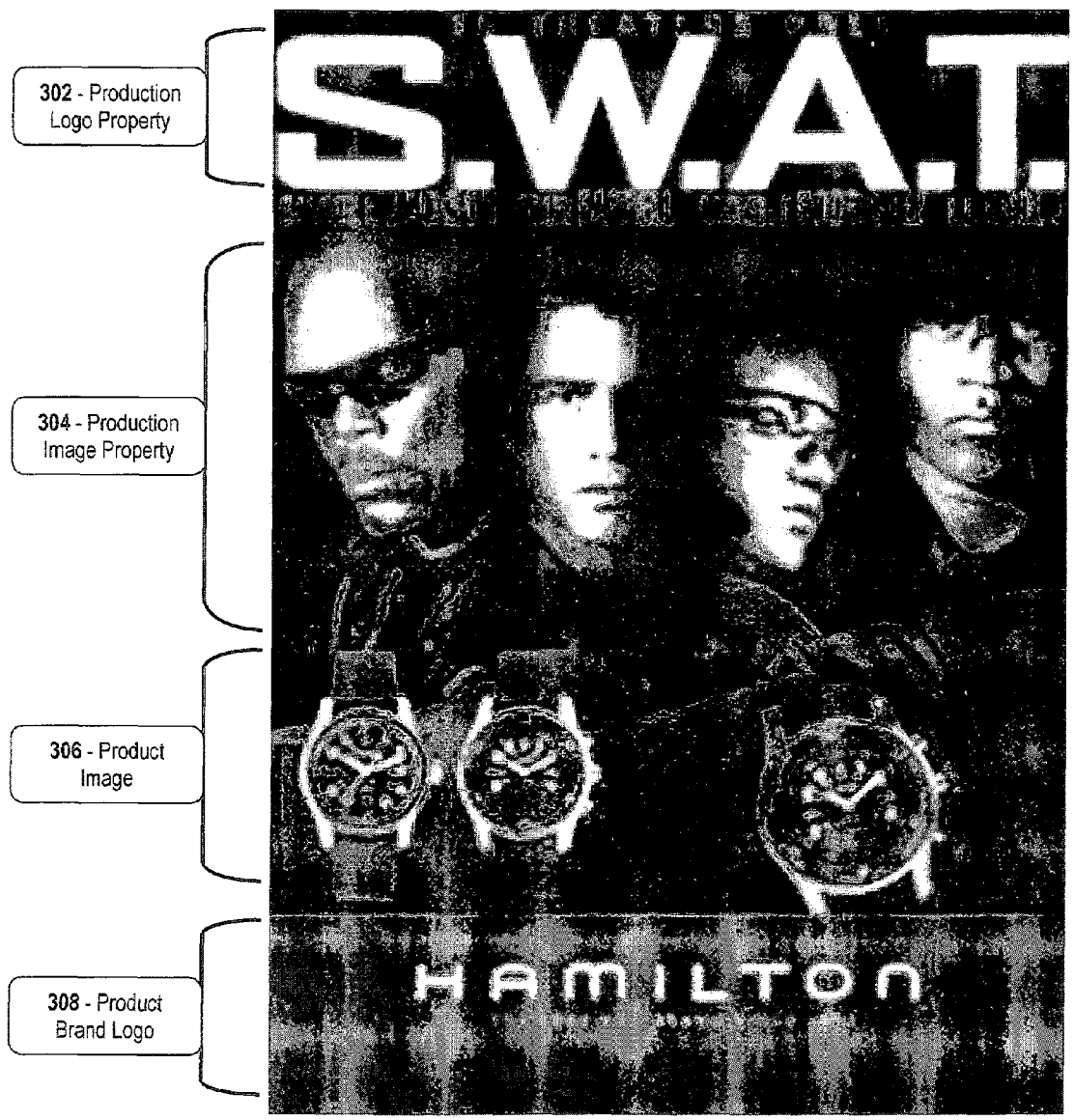
FIG. 3 is a Tie-In or Focused Advertising example in which the product brand and the production brand cooperatively market each other.
Figure 4:
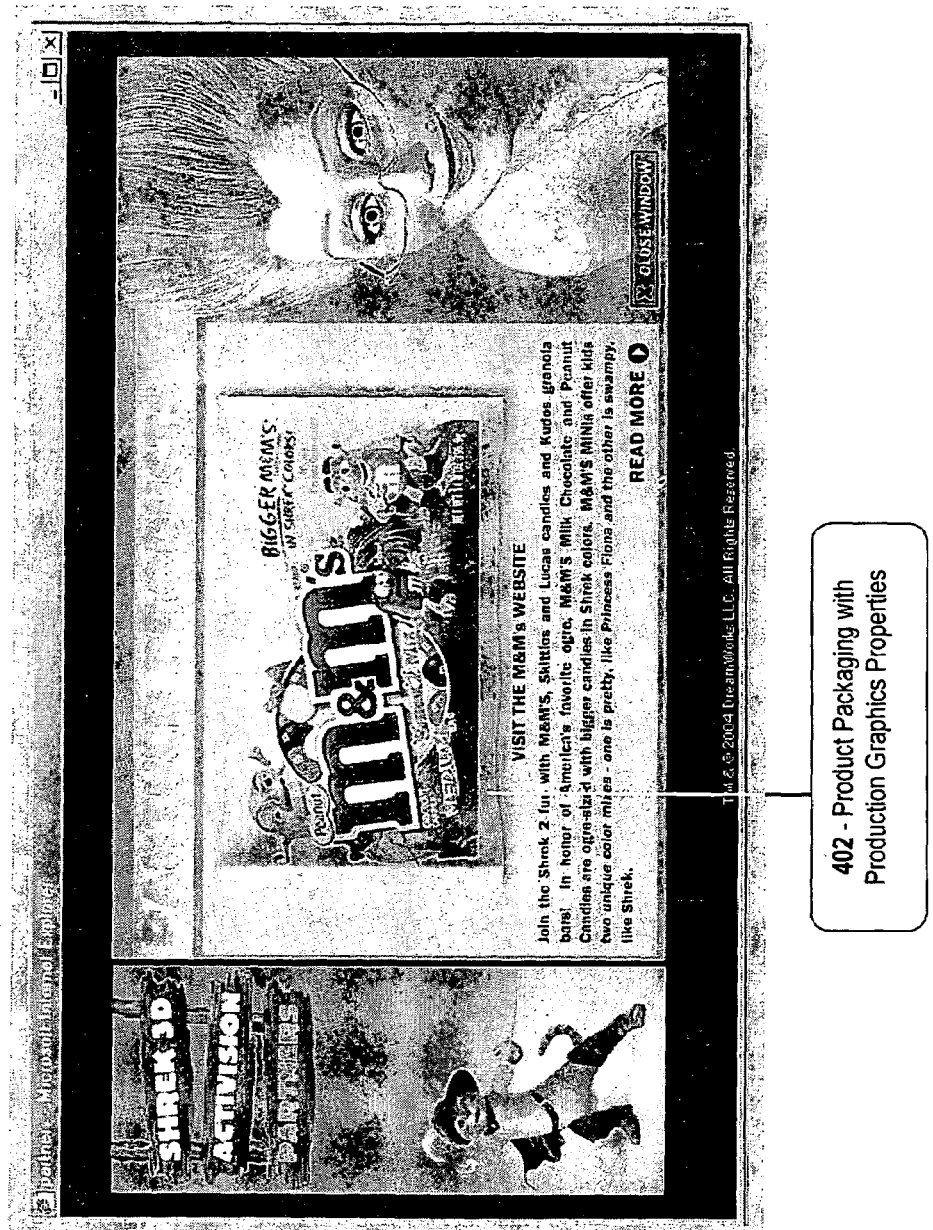
FIG. 4 is a Branded Entertainment Partnership example in which the product is not necessarily placed in the production, but the product brand and the production brand cooperatively market each other.

The described invention is a method and apparatus for cataloguing products featured in entertainment productions, in which the present invention provides a platform for information presentation, clear identification, direct and indirect purchasing, selling and marketing, and measuring marketing performance of products featured in entertainment productions. In a preferred embodiment, the invention provides a single, comprehensive forum of featured products in multiple entertainment productions, a marketing platform for delivering various marketing objectives in association with the entertainment production, and a vehicle for integrating traditional marketing initiatives with entertainment marketing objectives. Ultimately, the functions of the invention apply Web-based and/or programmable technology to augment and add value to product placement advertising and integrated entertainment marketing.

In the following description, for purposes of explanation, numerous specific details are set forth in order to provide a thorough understanding of the present invention. It will be apparent, however, to one skilled in the art, that the present invention may be practiced without some of these specific details. In other instances, well-known structures and devices are shown in diagram form.

Furthermore, the following description includes the present preferences and envisioned variations of the invention.

Additionally, terms used to describe the invention may vary in definition according to certain industry-specific or other arguable meanings. For the purpose of describing the invention, the words "product" and/or "brand" shall refer to any good or service representing any brand, manufacturer, or agent of the brand or manufacturer; the words "retail" and "retailer" shall refer to any reseller of a given product; the term "general advertiser" shall refer to any advertiser, including product and retail advertisers and advertisers directly associated with the entertainment production; the term "marketing communication" shall refer to a marketing effort to deliver a specific message (e.g., product or brand image, price point, attributes, benefits, features, description, selling message, unique selling proposition, promotion or coupon, value, and the like) to a consumer, in which any form of the term "advertising" may also describe marketing communication; the term "creative" as a noun in the context of advertising shall refer to an advertisement, typically communicating a strategic marketing message by incorporating artwork, graphics, logos, descriptive text, and/or the like; the term "entertainment production" shall refer to any high-profile production of entertainment value including, but not limited to, motion pictures, television programs, music, music videos, video games, celebrity appearances, awards ceremonies, and/or sporting events; and, the terms "user," "visitor," "customer," and/or "consumer" may be used synonymously.

For the purposes of this description, one may assume a "product" or "featured product" is a product featured in an entertainment production, including, but not limited to, products used as props, script elements, set fixtures, set design, wardrobe, costume design, equipment, vehicles and machinery, outdoor and indoor signage, production locations, venues, and/or embedded storyline ads.

As will be described in greater detail below, the present invention in one embodiment includes features for simplifying and enhancing the entertainment shopping experience for consumers and the entertainment-associated communications initiatives for marketers. Consumers use the invention to clearly identify products of interest featured in entertainment productions. Consumers may also use the invention to search for other goods and services marketable through the invention (e.g. an island resort where a motion picture was filmed or the designer of a particular garden). The invention presents featured product information, which, in most cases, is otherwise unavailable, on an easily searchable forum. Consumers also receive listings of retailers offering those featured products.

Entertainment marketers may use the invention in one embodiment to reduce the risk of low response behavior and recall generated from the product placement, regardless of how much or how little raw exposure and visibility the placement earns. Marketers may also employ the invention to deliver planned advertising messages such as product image, price points, features, benefits, attributes, promotions, purchasing options, and the like. The invention in one embodiment delivers marketing messages in an entertaining, non-intrusive format. The method delivers messages targeted to a relevant audience as it engages consumers in a shopping mindset. As a result, the invention captures marketing research data and measurements for marketers to evaluate effectiveness and to learn more about their consumers. An advertiser may also be provided with or access those research data and measurements to view and monitor performance.

In one embodiment of the invention, a promotional offering message is linked to a redeemable format (e.g., printable coupon, barcode, promotional code, etc.). In some cases, the promotional offering may be a premium, such as a free sample, direct mailing, and the like. In such cases, the invention may link to the advertiser's promotions fulfillment center in order to process and execute such offerings. The invention may electronically send the user's information, such as name, address, and contact information, to the fulfillment center, thus allowing the fulfillment center to deliver the promotional offering.

In addition to the marketing initiatives described above, retailers may use the invention to stimulate and drive store traffic and sales. In association with high-profile, featured products, the retailer can communicate shopping information to consumers. Furthermore, the invention can track the correlation of product sales to the product's exposure in the entertainment production.

From the producer's perspective, the invention adds value to the production's product placements. This value may encourage entertainment marketing partnerships to the production, increasingly reduce production costs, elevate the quality and authenticity of props, wardrobe, fixtures, etc., and add sources of revenue from reselling supplied products.

Process Overview

Figure 5:
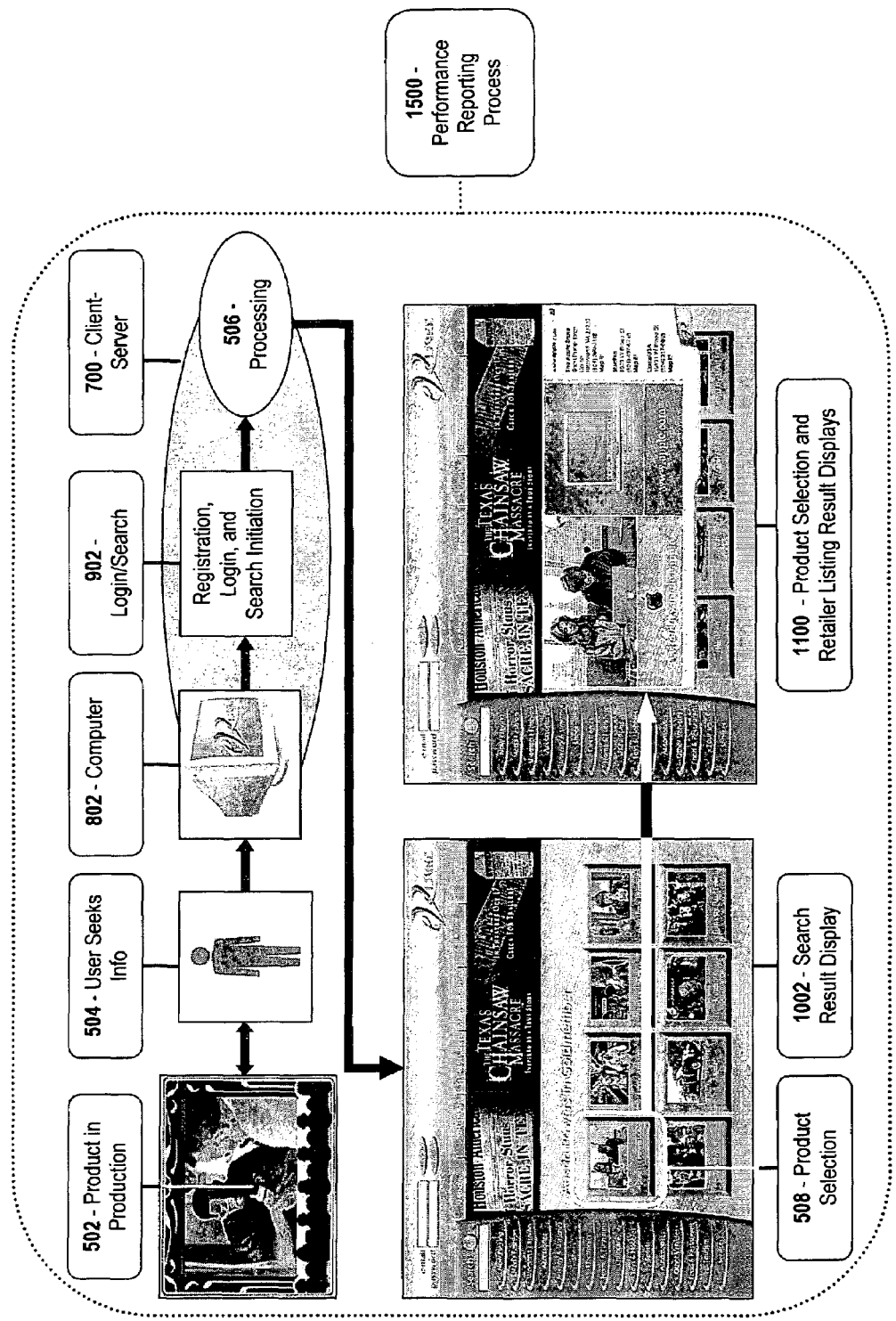
FIG. 5 is an illustrative overview of the various processes and components in one embodiment of the present invention.

FIG. 5 conceptually illustrates an overview of one embodiment of the invention. The entertainment production, such as a motion picture, television program, public event, and the like, features marketable products 502. The audience member 504 then uses a computer system 802 to access the software of the present invention. The client/server system in which the present invention is implemented is shown as element 700. The user 504 registers to logon and use the invention as shown in box 902. If the user has previously registered to use the invention, then the user may simply logon. It is envisioned that under certain circumstances, the invention may be open for use by the public without registration and/or logon. Accordingly, the use, herein, of the term "authorizing access to a user" can include granting access to a user without requiring registration or login.

The user may then search for products via various intuitive search options. The invention then processes the search 506 and generates a list of results on a search result display 1002.

The user then selects a particular product 508, which in turn generates a secondary and tertiary product selection and retailer listing result displays 1100. The secondary result screen presents detailed information on the product. A tertiary result screen may also present a listing of retailers offering the product and matching the user's demographic area. The user may receive specific marketing messages, purchase the product through the present invention, purchase the product offline, link to a relevant separate website, or receive other pertinent information. All activity and registered information may be tracked by the invention through a processing feature, preferably an Online Analytical Processing (OLAP) 1500 feature. Full descriptions and details of each process level are further described below.

The present invention is preferably distributed as a web application over the Internet; however, the invention may be distributed in other media formats. The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, DVDs, magneto-optical disks, ROMs, RAMs, EPROMs, EEPROMs, magnet or optical cards, or other types of media/machine-readable medium suitable for storing electronic instructions, programs, and data. The present invention may also be provided as a computer program product which may include future technological advancements regarding media formats. Moreover, the present invention may also be downloaded as a computer program product, wherein the program may be transferred from a remote computer (e.g. a server) to a requesting computer (e.g. a client) by way of data signals embodied in a carrier wave or other propagation medium via a communication link (e.g. a modem or network connection).

Figure 6:
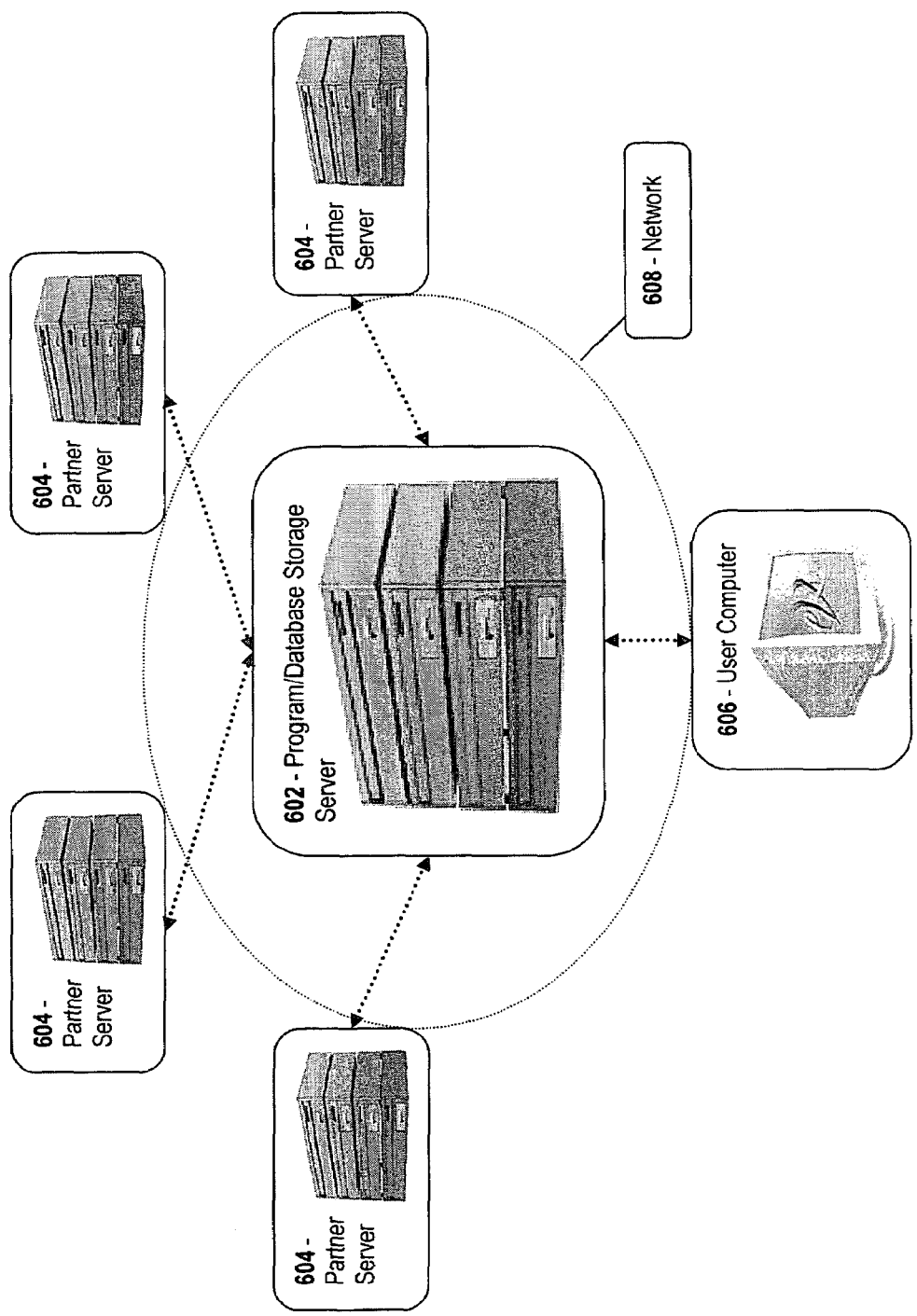
FIG. 6 is an exemplary illustration of how the present invention stores its program and data, how the storage unit links to external data stored at other locations, and the present invention may be distributed, and how a user may access the present invention in one embodiment of the present invention.

The preferred system of program and content database storage for the invention is described by example in FIG. 6. In the preferred embodiment, the invention's programming data and content database are stored on a main host program/database server 602. The host program/database server 602 may reciprocate communication with external programs and information over a network 608, preferably the World Wide Web or the Internet, in which external programs and information may be stored on partner servers 604. A user may access and receive information from the main host program/database server 602 via the network 608 connection.

Client-Server Environment

Figure 7:
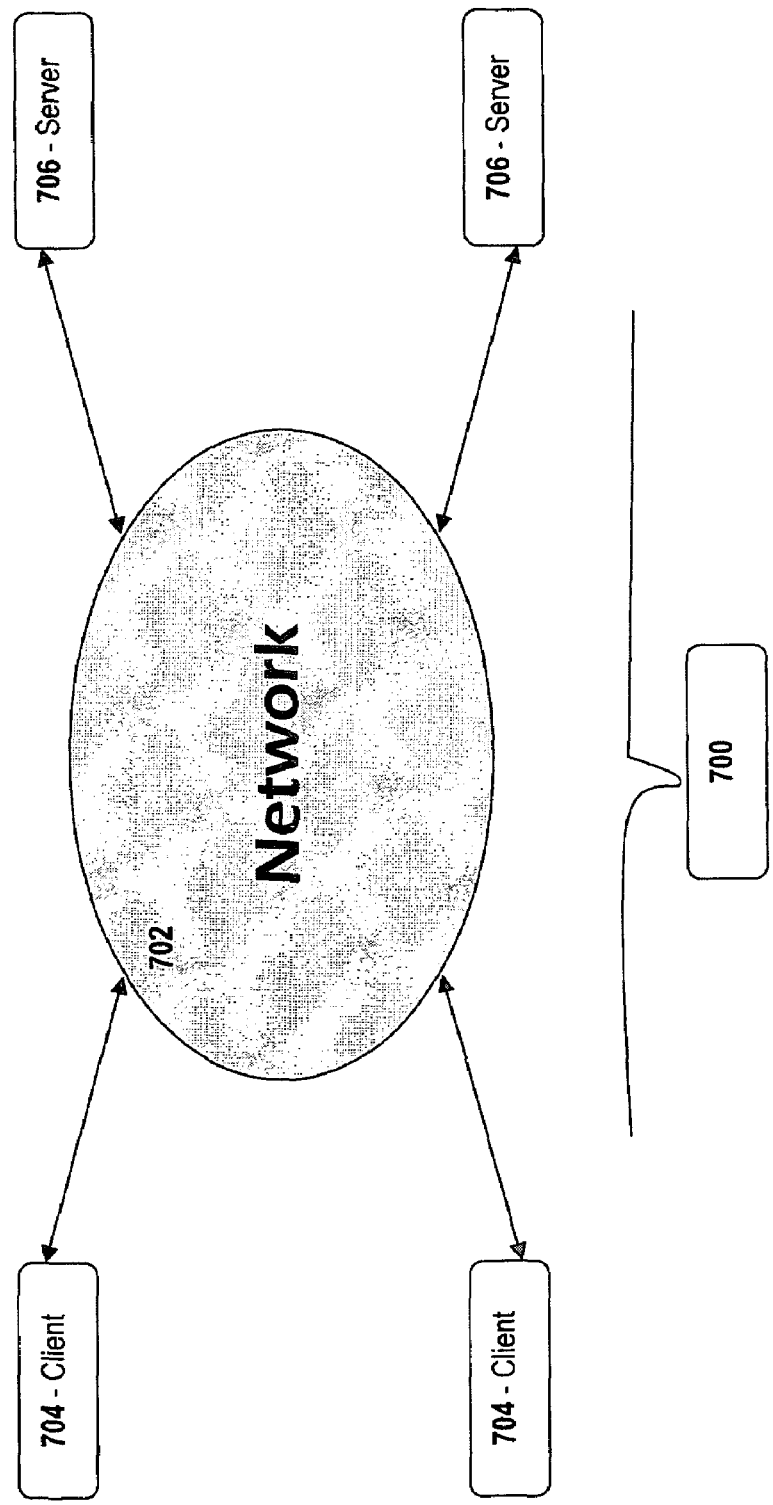
FIG. 7 is a simplified view of an exemplary client-server environment in which online commerce may take place.

FIG. 7 is a simplified view of an exemplary client-server environment 700, such as the World Wide Web (the Web), in which online commerce may take place. The architecture of the Web follows a conventional client-server model. The terms "client" and "server" are used to refer to a computer's general role as a requester of data (the client) or provider of data (the server). Web clients 704 and Web servers 706 communicate using a protocol such as HyperText Transfer Protocol (HTTP). In the Web environment, Web browsers reside on clients and render Web documents (pages) served by the Web servers. The client-server model is used to communicate information between clients 704 and servers 706. Web servers 706 are coupled to the network Internet 702 and respond to document requests and/or other queries from Web clients 704. When a user selects a document by submitting its Uniform Resource Locator (URL), a Web browser, such as Netscape Navigator, Internet Explorer, or Mac Safari, opens a connection to the server 706 and initiates a request (e.g. an HTTP get) for a document. The server 706 delivers the requested document, typically in the form of a text document coded in a standard markup language such as HyperText Markup Language (HTML).

Exemplary Computer System

Figure 8:
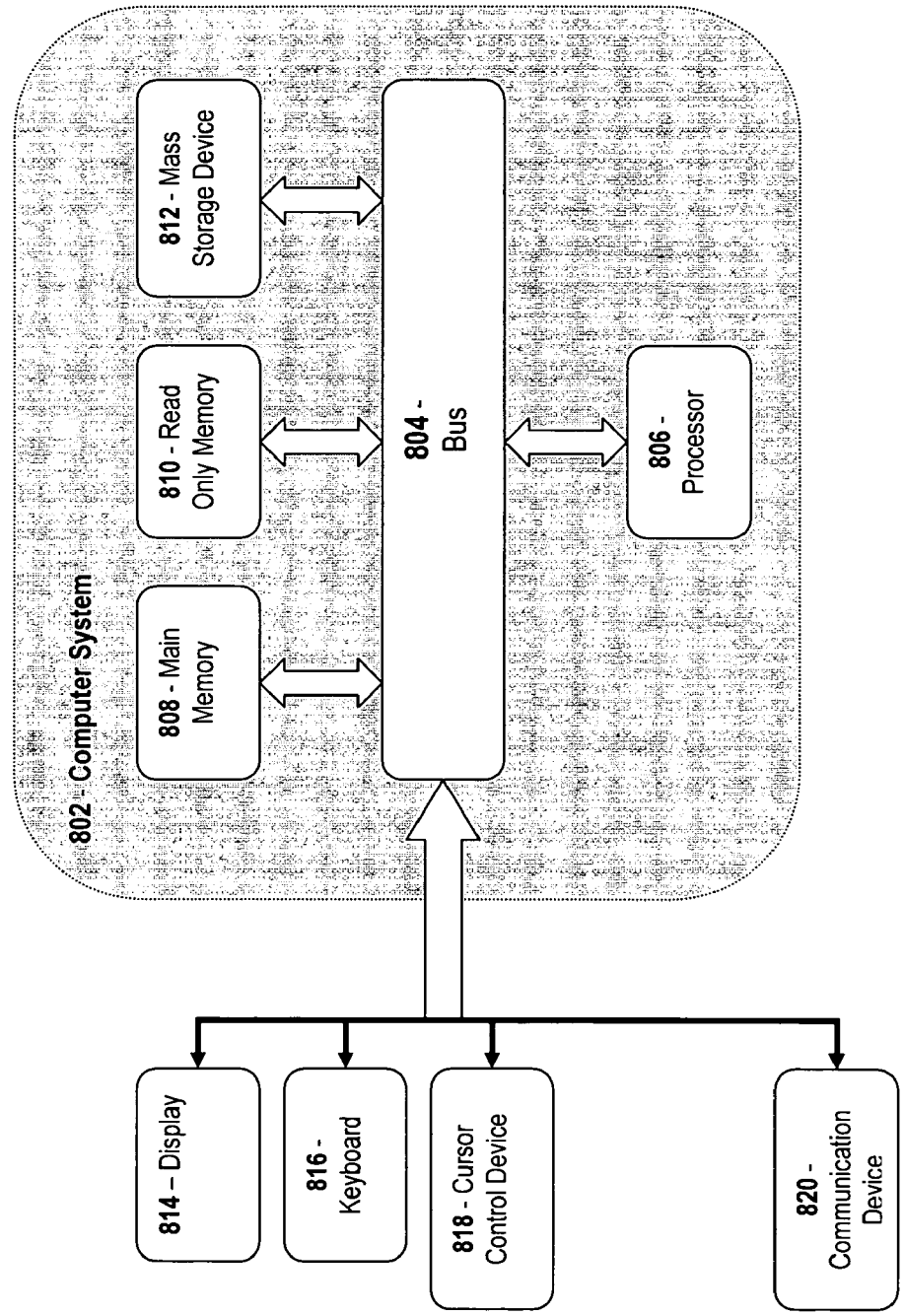
FIG. 8 is an example of a computer system in which one embodiment of the present invention may be implemented.

A computer system 802 representing an exemplary server in which features of the present invention may be implemented will now be described with reference to FIG. 8. Computer system 802 comprises a bus or other communication means 804 for communicating information, and a processing means such as processor 806 coupled with bus 804 for processing information. Computer system 802 further comprises a random access memory (RAM) or other dynamic storage device 808 (referred to as main memory), coupled to bus 804 for storing information and instructions to be executed by processor 806. Main memory 808 also may be used for storing temporary variables or other intermediate information during execution of instructions by processor 806. Computer system 802 also comprises a read only memory (ROM) and/or other static storage device 810 coupled to bus 804 for storing static information and instructions for processor 806.

A data storage device 812 such as a magnetic disk or optical disc and its corresponding drive may also be coupled to computer system 802 for storing information and instructions. Computer system 802 can also be coupled via bus 804 to display device 814, such as a cathode ray tube (CRT) or Liquid Crystal Display (LCD), for displaying information to a computer user. Typically, an alphanumeric input device 816, including alphanumeric and other keys, may be coupled to bus 804 for communicating information and/or command selections to processor 806. Another type of user input device is cursor control 818, such as a mouse, trackball, or cursor direction keys for communicating direction information and command selections to processor 806 and for controlling cursor movement on display.

A communication device 820 is also coupled to bus 804 for accessing remote servers via the Internet, for example. The communication device 820 may include a modem, a network interface card, or other commercially available network interface devices, such as those used for coupling to an Ethernet, token ring, or other type of network. In any event, in this manner, the computer system 802 may be coupled to a number of clients and/or other servers via a conventional network infrastructure, such as a company's Intranet and/or the Internet, for example.

User Registration/Login and Navigation

Figure 9:
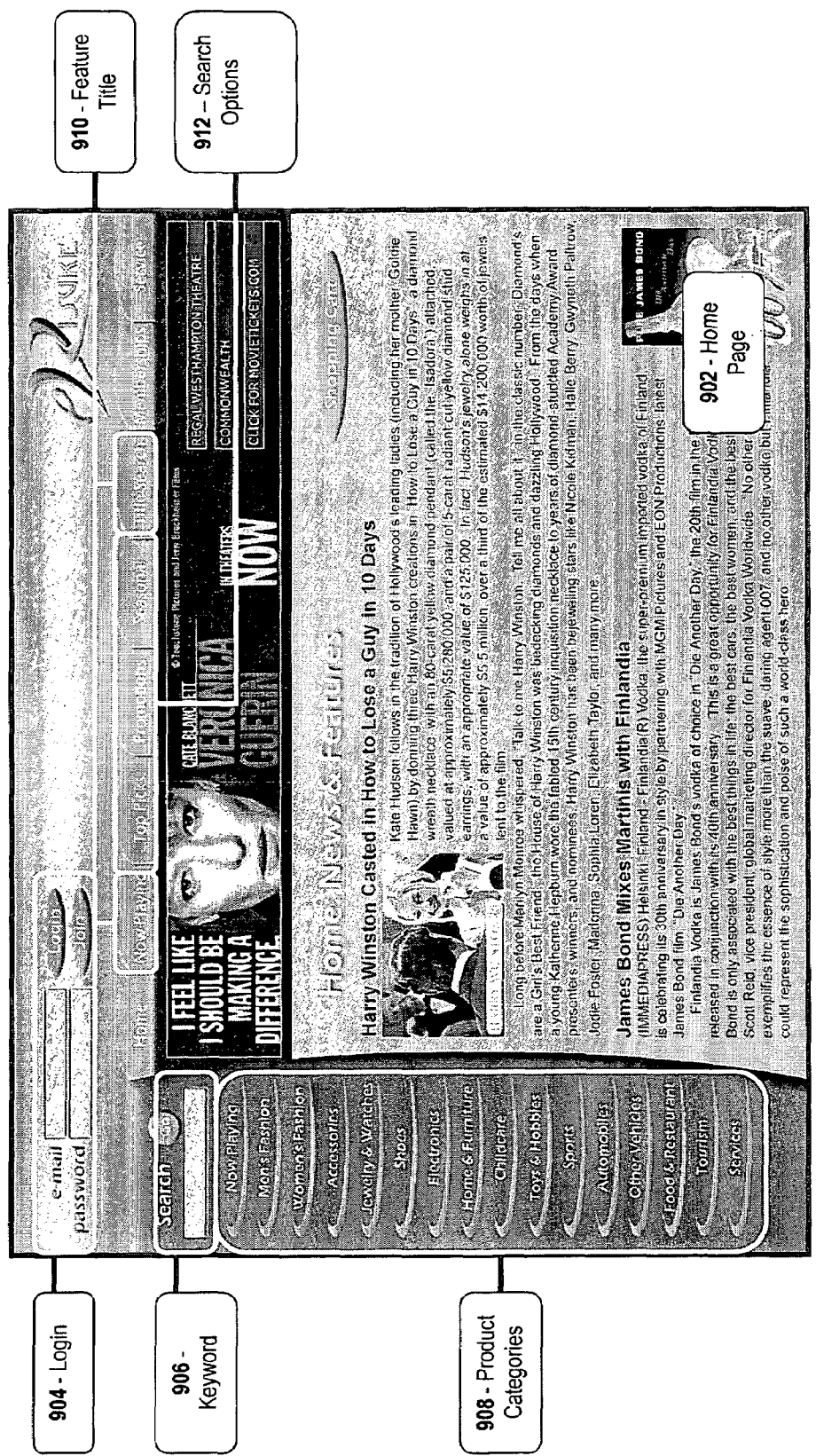
FIG. 9 illustrates the user's login phase and search options for initiating featured product search using one embodiment of the present invention.

FIG. 9 describes the user's login and search options for initiating featured product search in which one embodiment of the present invention may be used. The user registers to provide demographic information. Demographic information may include gender, age, address, shopping habits, and the like. The present invention stores this information for generating measurements and statistics, preferably through an Online Analytical Processing (OLAP) feature integrated in the invention.

Once registered, the user may navigate the invention in the following manner: In the Login block 904, the user logs-in to establish user identity by entering his e-mail and password. The user may browse the invention through various intuitive options including the presented common browsing channels. Common browsing channels, for example, include keyword search 906, feature title 910, proper name, and product category 908 searches. A keyword search 906 results in a page listing any featured product matching that/those keyword(s). The keyword(s) may be designated by the advertiser to match with the advertiser's product for optimal listings, or the keyword(s) may be matched according to the program. A keyword search 906 may be used to search a brand name to list all featured products matching that brand name. A search of a particular actor/actress, director, or other known name lists all featured products associated with that name. A keyword search 906 method may be used to obtain any of the described search options.

A feature title search 910 lists all featured products used in the production. The user may also select a feature title link from a list of productions represented on the program, and the list of productions may be subcategorized alphabetically, by time (i.e. current releases), or other intuitive options.

Featured products may be grouped by their good or service category. Product categories 908 include categories and subcategories in the Product Category 908 listing of search links. Product category 908 search links may include men's/women's fashion, accessories, jewelry and watches, footwear, electronics, home and furniture, childcare, toys and hobbies, sports, automobiles, other vehicles, events and tourism, food and restaurant, music, seasonal, services, and the like. A selection of a product category 908 links to a list of goods and services matching that product category description.

Figure 10:
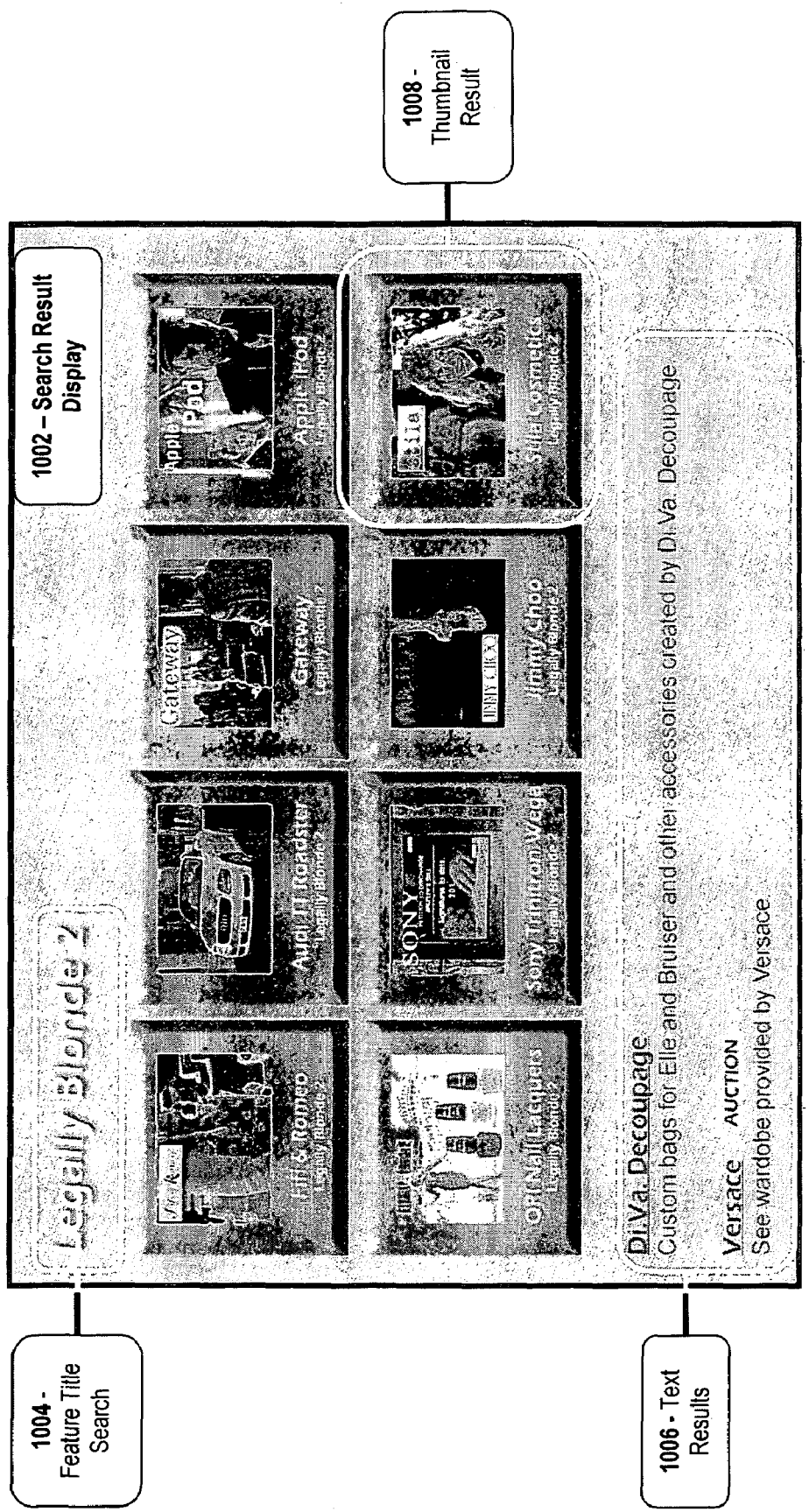
FIG. 10 illustrates a display of results from a particular search in one embodiment of the present invention.

FIG. 10 illustrates a display of results from a particular search in one embodiment of the present invention. A listing of results on a search results display 1002 may include thumbnail 1008 and text results 1006, and each thumbnail 1008 or text result 1006 may link to additional information or shopping features, as is further described in the next paragraph. A thumbnail result 1008 may include a graphics image and a text label describing the product name or brand and the associated feature title. A text result 1006 may include a main heading and a short text description of the product. An advertiser may pay additionally for a particular order of listing, thumbnail, or text listing. The user may choose a preference in the order of listing, i.e. alphabetically, price range, popularity, brand name, user demographic traits, and the like.

Figure 11:
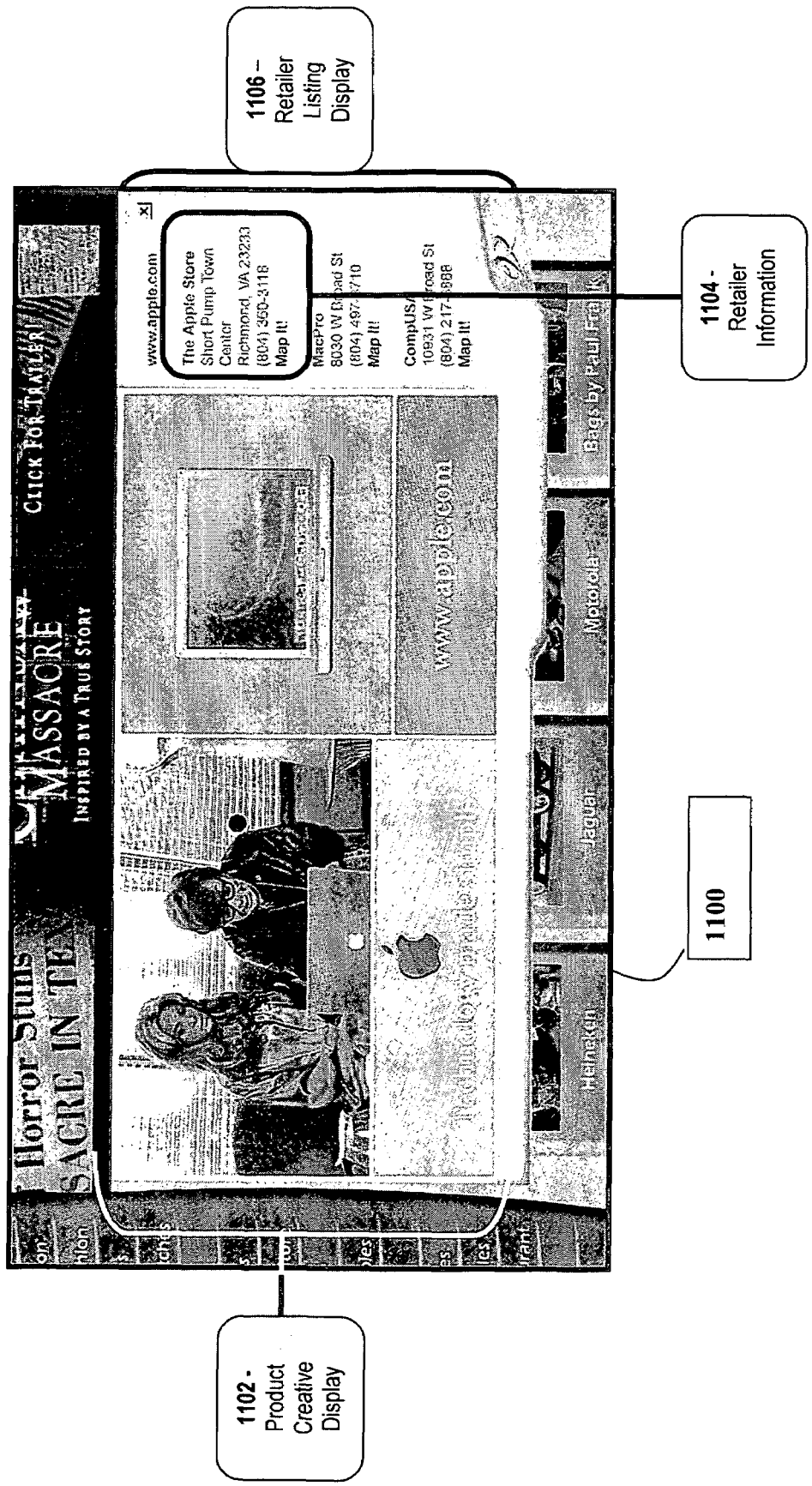
FIG. 11 illustrates a display of results from selecting a particular featured product including selected product information message, a list of retailers, and each retailer's designated information.

A second level of user action involves selecting a featured product, in which FIG. 11 illustrates a display of results 1100 which may include a product information message or ad creative coupled with another display for retailer information. The user may select a featured product for additional information by clicking on the thumbnail 1008 or text 1006 link. Featured product selection links to a creative display 1102 which communicates a marketing message. The creative display 1102 message may be any combination or multiples of a creative ad, a simple product image, a text description, price points, product features and attributes, a promotion or coupon, and the like. The creative display 1102 message may be in a still or a media-enriched format to incorporate multiple frames, animation, clips, sound, or any form of creative or interactive artwork. The message may also link to an official website or additional media stored in any location.

A third level of user action involves a separate display (retailer listing display 1106) upon activation by the user or upon activation automated by the program. The retailer listing display 1106 includes a list of online and offline retailers of the selected product. Offline retailers are matched according to the user's location. A retailer listing may include various retailer information 1104 such as the retailer's name, location, and contact information, a link to directions or a map of the retailer, a link to contact the retailer, a link to a marketing message for the retailer, a link to an official website, or a link to additional media stored in any location.

Action toggles may be included on the creative display 1102, retailer listing display 1106, or a separate display. Action toggles may include purchase/shopping cart, official web link, message print, or other shopping feature options.

As a user searches for a product using the present invention's various search features, the program matches the user with the requested product(s) and all information linked to those products, retailers of those products geographically nearest the user and all information linked to those retailers, and general ads related to the search elements and activity. All search matching processes shall be described in detail below.

Figure 12:
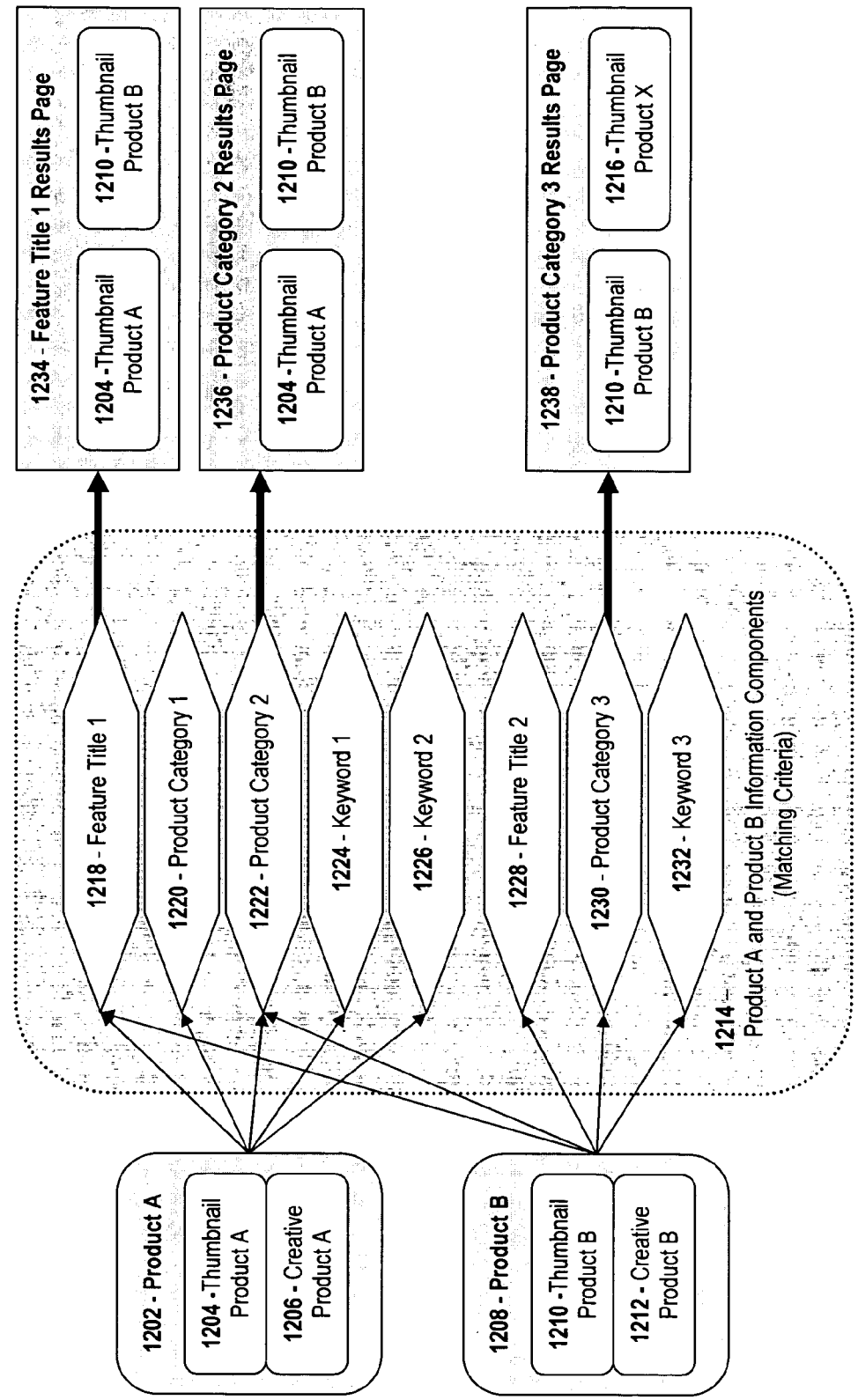
FIG. 12 conceptually describes the process for matching products included in the invention with user search options.

FIG. 12 represents the process by which products are matched with user search criteria. A featured product is represented in the program by the product's information, which is broken down into major criteria components 1214, primarily including product elements, product thumbnail, and product creative. The product elements characterize the product with specific terms, such as feature titles, product categories, brand names, and other keywords describing the product. The thumbnail is an identifiable graphic image of the product, and the thumbnail, in some search cases, may be converted into identifiable text. The thumbnail may also be a reduced image of the creative. The creative is an advertising message which may incorporate various graphics, logos, artwork, creative copy (text descriptions), and the like.

A product's search components may include more than one feature title, product category, keyword, etc. For example Product A 1202 is specified for only one feature title 1218, but it is also specified for two different product categories (1220 and 1222) and two different keywords(1224 and 1226), creating a total of five different components. On the other hand, Product B 1208 is specified for two separate feature titles (1218 and 1228), two product categories (1222 and 1230), and one keyword (1230), also creating a total of five different components. Product A 1202 and Product B 1208 both match Feature Title 1 1218 and Product Category 2 1222.

As the user inputs a search option, the invention matches search criteria with the product's segmented components. The search generates a results page including all products matching the search criteria. The examples provided in FIG. 12 include Feature Title 1 Results Page 1234, Product Category 2 Results Page 1236, and Product Category 3 Results Page 1238. Each result page lists the thumbnails of matching products. A search for a feature title results in all products included in that feature title (e.g. all products matching that component), as exemplified by the Feature Title 1 Results Page 1234 listing both Product A thumbnail 1204 and Product B thumbnail 1210. A search for a product category results in all products fitting that category's description, as exemplified by the Product Category 2 Results Page 1236 listing both Product A thumbnail 1204 and Product B thumbnail 1210. The Product Category 3 Results Page 1238 exemplifies a search for a product category which lists Product B thumbnail 1210, and other possible matching products (Product X thumbnail 1216), but not Product A.

Results pages list product thumbnails which are linked to their respective product creatives. The user may select a thumbnail and link to the creative and other information. As exemplified in FIG. 12, Product A 1202 information consists of its thumbnail 1204, its creative 1206, and any other information linked to those elements. As the search result page lists a thumbnail, that thumbnail links to all product information representing the product. For example, Product A thumbnail 1204, listed on the Feature Title 1 Results Page 1234, links to Product A creative 1206.

Figure 13:
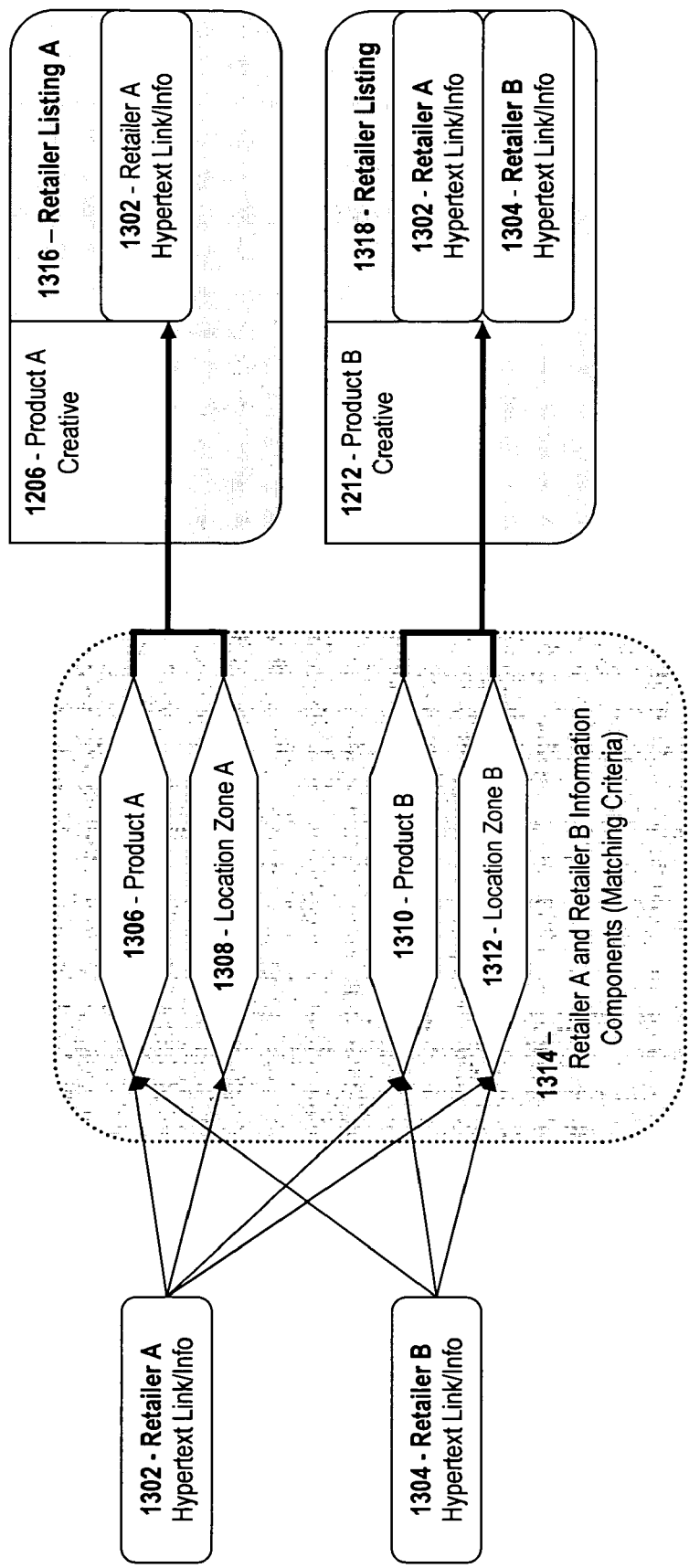
FIG. 13 conceptually describes the process for matching retailers with selected products and user locations.

FIG. 13 represents the process of matching retailers with selected products and the user's inputted location. A retailer is represented in the program by the retailer's information, which is broken down into major criteria components, primarily including the products offered by the retailer and the retailer's location.

A retailer's search components may entail more than one product and more than one location. For example, Retailer A 1302 sells both Product A 1306 and Product B 1310, and its location covers both user Location Zone A 1308 and user Location Zone B 1312. Retailer B 1304 sells both Product A 1306 and Product B 1310; however, Retailer B's location fits the criteria for Location Zone B 1312, but may be outside of range to fit Location Zone A's 1308 area.

The user's location is automatically processed through registration and login. As the user selects a product, the product's respective information appears, and the retailers are matched with the product and the user's location. Exemplified in FIG. 13, a selected product creative is matched with Product A 1306 offered by both Retailer A 1302 and Retailer B 1304. However, Retailer B 1304 does not match the user's location. Thus, the Retailer Listing A 1316 for Product A lists Retailer A 1302. Exemplified in Retailer Listing B 1318, the user selects Product B 1310 and is matched with Product B 1310 offered by both Retailer A 1302 and Retailer B 1304 as both retailers fit the user's location criterion. Thus, the Retailer Directory B 1318 for Product B lists both Retailer A 1302 and Retailer B 1304, and each retailer listing includes their respective information, which may include contact information, address, hypertext links to a designated websites, hypertext links to designated marketing messages, a location map, and the like.

Figure 14:
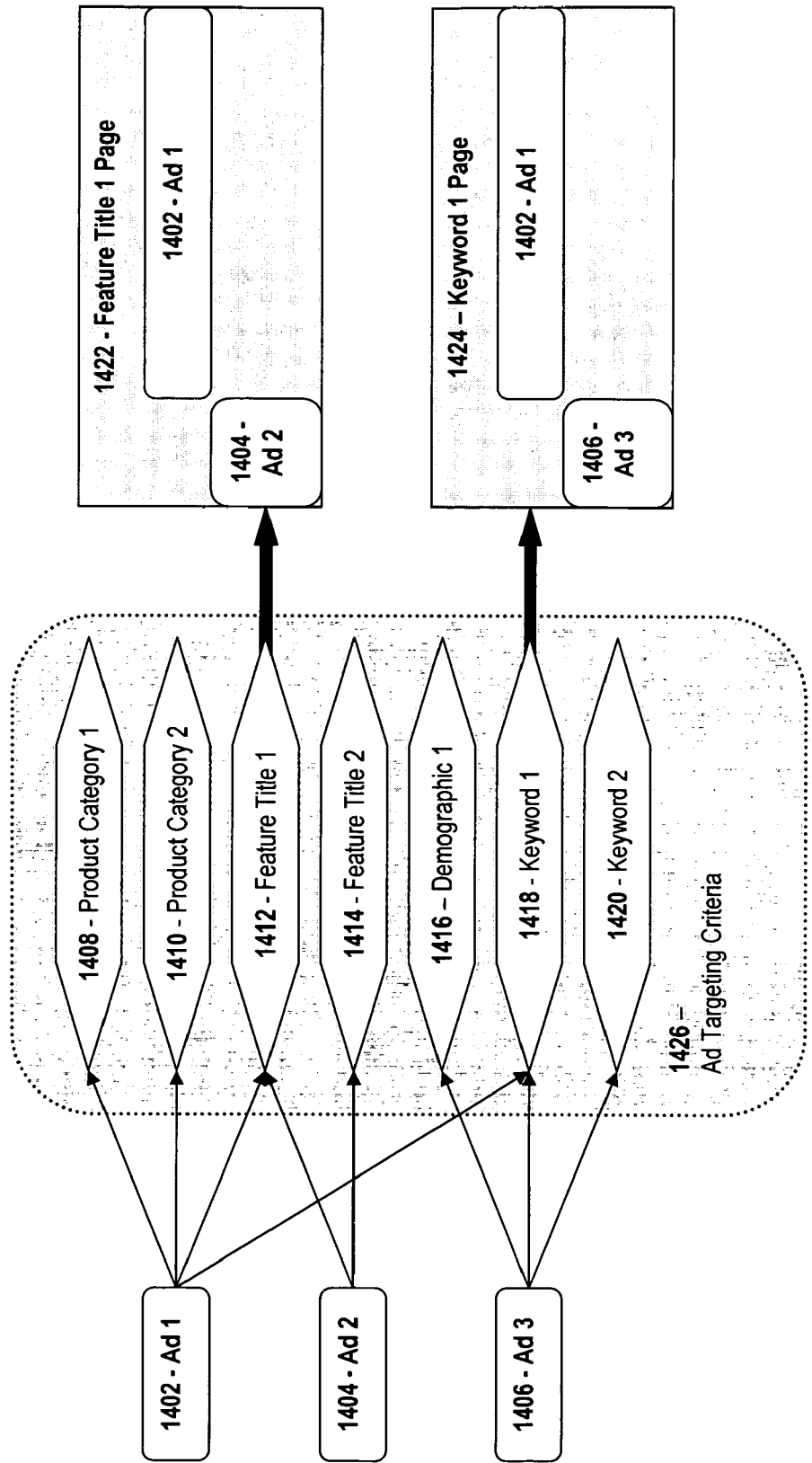
FIG. 14 conceptually describes the process for matching targeted ads with user traits and user search activity traits.

FIG. 14 represents the process in which general banner/sponsor ads are matched with user search criteria. General banner/sponsor ads are not necessarily related to entertainment productions and are targeted to fit the consumer profile determined by the user's search activity, demographic traits, and other relevant data. Advertisers may wish to place their ads according to such consumer profiles.

A consumer profile is determined by the advertiser, and that profile may include certain user activity and characteristics captured by the invention, which are in turn converted and segmented into ad targeting criteria 1426. Those characteristics may include demographic information provided through registration or login and specified search activity, including feature title, product category, and keyword searches. Other statistical data generated by the user's activity and processed by the invention program may also be implemented to match the user with relevant ads. The more criteria an ad designates to match, the less targeted that ad may be. Conversely, fewer designated criteria designated by the ad may be considered a higher, more specific level of targeting.

Ad 1 1402 targets users searching Product Category 1 1408, and/or Product Category 2 1410, Feature Title 1 1412, and/or Keyword 1 1418, and the invention places Ad 1 1402 on pages those users view (i.e. 1422 and 1424). Ad 2 1404 targets users searching Feature Title 1 1412 and/or Feature Title 2 1414, and the invention places Ad 2 1404 on pages those users view (i.e. 1422). Ad 3 1406 targets users fitting Demographic 1 1416, and/or searching Keyword 1 1418, and/or Keyword 2 1420, and the invention places Ad 3 1406 on pages those users view (i.e. 1424). As exemplified in the Feature Title 1 Page 1422, Ad 1 1402 and Ad 2 1404 match the Feature Title 1 1412 criterion, and both Ad 1 1402 and Ad 2 1404 are placed on the Feature Title 1 result page 1422. As exemplified in the Keyword 1 Page 1424, Ad 1 1402 and Ad 3 1406 match the Keyword 1 1418 criterion, and both Ad 1 1402 and Ad 3 1406 are placed on Keyword 1 results page 1424.

In the case of conflicting ad placement, where more than one ad may be designated for the same position, terms of contractual agreements may supercede placement criteria. Such terms may entail a specified level of impressions or placements, ad placement timing, first-come-first-serve policy, and the like.

As performance evaluation is a concern in the product placement/integrated entertainment marketing field, FIG. 15 conceptually describes the invention's process for generating reports for marketers to evaluate the product's performance in correlation to the entertainment production.

In general, marketing communications performance may be evaluated along a process beginning from initial exposure to purchasing. A consumer receives initial exposure, in the case of the present field, the product placement exposure. A marketing objective may simply benchmark a certain level of impressions, and/or audience members reached, and/or exposure frequency. The consumer may ignore the exposure, or the exposure may spark a further level of interest. By recall, that interest may lead the consumer to seek further information about the product, signifying an initial response behavior to the product placement exposure. The level of interest may be measured by the amount of information sought, level of search activity, length of search time, and the like. A further significance of influenced consumer behavior may entail seeking purchasing information, and the ultimate level of product placement effectiveness is product purchasing. Other pertinent marketing data may include research on consumer demographics. In sum, marketers value information on who the consumer is, what the consumer is doing, and to what extent that consumer engages in shopping-related activities.

The preferred embodiment of the present invention dually serves both consumer and advertiser markets. By employing the present invention, advertisers may monitor and evaluate a product's marketing performance in correlation to the entertainment production partnership by gauging the levels of consumer exposure and response behavior. In FIG. 15, the invention captures raw data 1501, inputted by an administrator or tracked by the program, and it processes the information, preferably through an Online Analytical Processor (OLAP) 1522 to generate reports 1524, which then may be provided to or accessed by an advertiser 1526. Raw data 1501 may include the user's demographic information 1502, certain coefficients, variables, or calculations manually inputted 1504, product performance in keyword searches 1506, product performance in product categories 1508, product impressions 1510 and click-throughs, leads to external websites 1512, online purchases 1514, number of promotions distributed 1516, number of promotions redeemed 1518, and other relevant data 1520 such as point of sale store data. All data may be used for calculating formulas, ratios, unit conversion, and other relevant metrics which may be presented in specified performance categories. Furthermore, each data set may be significantly related to one another, and all data set correlations may track to the production's total audience population and/or audience sample to signify the relationship from overall audience members addressed to responsive audience members. The present invention is not limited to any specific method performed by the Online Analytic Processor to generate the desired reports. Those skilled in the art will recognize that such processor based report generators are known.

The OLAP 1522 converts the data into presentable performance reports 1524. An advertiser 1526 may logon to the system and view such reports 1524. The performance reports 1524 may be used as a tool to monitor and evaluate product performance, for researching consumers, for strategic decision-making, and/or for billing purposes, as advertisers may be billed according to certain performance metrics (e.g. total impressions, click-throughs, product sales, and the like).

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principals of the present invention and its practical application to enable one skilled in the art to utilize the present invention in various embodiments and with various modifications as are suited to the particular use contemplated.

What is claimed is:

1. A method of providing a user with product information on products featured in entertainment productions, said method comprising:
    displaying products identified from a catalogue of product information on a display screen of a user computer and visual indicators related to entertainment productions associated with the products;
    receiving a product selection from a user;
    displaying detailed product information on a display screen of a user computer based on said product selection;
    collecting and storing user information and at least a portion of said user's selections; determining information regarding selections made during a particular time period by a plurality of users accessing a web page containing the catalogue of product information, such information including information as to which navigation methods each of said plurality of users used to find a particular one of said products from said catalog of product information, said information including names of movies, television programs, actors, and/or actresses for which the particular one of said products is associated; and
    generating and outputting performance reports including the determined information based upon said collected information.

2. A method according to claim 1, further comprising displaying retailer information on a display screen of a user computer based on said product selection.

3. A method according to claim 2, wherein said retailer information includes an identification of retailers who carry said product selection and are located within a predetermined distance from, an entered user location.

4. A method according to claim 1, further comprising redirecting a user to a location to purchase said product selection on-line.

5. A method according to claim 1, wherein said visual indicators are product thumbnails.

6. A method according to claim 1, wherein said visual indicators are video clips.

7. A method according to claim 1, wherein said search request is an identification of a specific entertainment production and said displayed products are those which are associated with said specific entertainment production.

8. A method according to claim 1, wherein said search request is an identification of a product category and said displayed products are those which are associated with said product category.

9. A method according to claim 1, wherein said detailed product information includes a product creative.

10. A method according to claim 9, wherein said product creative includes an advertising message.

11. A method according to claim 1, further comprising displaying a targeted advertisement on said display screen.

12. A method according to claim 11, further comprising invoking a promotional redemption related to said targeted advertisement.

13. A method according to claim 11, wherein said targeted advertisement is selected based upon said collected information.

14. A method according to claim 13, wherein said targeted advertisement comprises a plurality of advertisements, an arrangement of said plurality of advertisements on said display screen being dependent on a relative value placed on retailers providing said plurality of advertisements.

15. A method according to claim 1, further comprising:
    performing a behavioral analysis of said information regarding selections, wherein said behavioral analysis includes analyzing demographic profiles of users with respect to product placement.

16. A method according to claim 15, wherein said step of performing a behavioral analysis comprises the steps of:
    obtaining information regarding demographic information of said users;
    obtaining information on product performance in keyword searches made by said users;
    obtaining information on product performance in product categories as provided by said users;
    obtaining information on product impressions as made by said users;
    obtaining information on click-throughs as made by said users; and
    obtaining information on online purchases as made by said users.

17. The method of claim 1, wherein said visual indicators are images of the entertainment productions including the products.

18. The method of claim 1, wherein generating said performance reports includes merging data associated with product placement exposure with data associated with on-line activity concerning the products.

19. The method of claim 1, further including accepting a search request from said user and querying said catalogue based on said search request.

20. A program product stored on a computer-readable medium, for providing a user with product information on products featured in entertainment productions, said program product comprising machine-readable program code for causing, when executed, one or more machines to perform the following method steps:
    displaying products identified from a catalogue of product information on a display screen of a user computer and visual indicators related to entertainment productions associated with the products;
    receiving a product selection from a user;
    displaying detailed product information on a display screen of a user computer based on said product selection;
    collecting and storing user information and at least a portion of said user's selections; determining information regarding selections made during a particular time period by a plurality of users accessing a web page containing the catalogue of product information, such information including information as to which navigation methods each of said plurality of users used to find a particular one of said products from said catalog of product information, said information including names of movies, television programs, actors, and/or actresses for which the particular one of said products is associated; and
    generating and outputting performance reports including the determined information based upon said collected information.

21. A program product according to claim 20, further comprising displaying retailer information on a display screen of a user computer based on said product selection.

22. A program product according to claim 21, wherein said retailer information includes an identification of retailers who carry said product selection and are located within a predetermined distance from an entered user location.

23. A program product according to claim 22, further comprising redirecting a user to a location to purchase said product selection on-line.

24. A program product according to claim 20, wherein said visual indicators are product thumbnails.

25. A program product according to claim 20, wherein said visual indicators are video clips.

26. A program product according to claim 20, wherein said search request is an identification of a specific entertainment production and said displayed products are those which are associated with said specific entertainment production.

27. A program product according to claim 20, wherein said search request is an identification of a product category and said displayed products are those which are associated with said product category.

28. A program product according to claim 20, wherein said detailed product information includes a product creative.

29. A program product according to claim 28, wherein said product creative includes an advertising message.

30. A program product according to claim 20, further comprising collecting and storing user information and at least a portion of said user's selections.

31. A program product according to claim 30, further comprising displaying a targeted advertisement on said display screen.

32. A program product according to claim 31, further comprising invoking a promotional redemption related to said targeted advertisement.

33. A program product according to claim 31, wherein said targeted advertisement is selected based upon said collected information.

34. A program product according to claim 33, wherein said targeted advertisement comprises a plurality of advertisements, an arrangement of said plurality of advertisements on said display screen being dependent on a relative value placed on retailers providing said plurality of advertisements.

35. A program product according to claim 30, further comprising generating a performance report based upon said collected information.

36. A program product according to claim 35, further comprising determining performance metrics based on information in said performance report; and
   billing advertisers a particular amount based on said performance metrics.

37. A program product according to claim 35, further comprising:
   providing said performance reports to advertisers who sell said products identified from said catalogue.

38. The program product of claim 20, wherein said visual indicators are images of the entertainment productions including the products.

39. The program product of claim 20, wherein generating said performance reports further includes merging data associated with product placement exposure with data associated with on-line activity concerning the products.

40. The program product of claim 20, further including accepting a search request from said user and querying said catalogue based on said search request.

41. A system for organizing and disseminating information on products featured in entertainment productions, said system comprising:
   a database for storing a catalogue of product information on products featured in entertainment productions; and
   a computer server programmed to perform the steps of:
   displaying products identified from said catalogue on a display screen of a user computer and visual indicators related to entertainment productions associated with the products;
   receiving a product selection from a user;
   displaying detailed product information on a display screen of a user computer based on said product selection;
   collecting and storing user information and at least a portion of said user's selections, including navigation methods;
   generating performance reports based upon said collected information; and
   providing said performance reports to advertisers who sell said products identified from said catalogue, said performance reports providing information concerning advertisement mechanisms to evaluate past, current and future placement of advertisements for said products offered for sale by said advertisers, said advertisement mechanisms including movies, television programs, actors and/or actresses.

42. A method according to claim 1, further comprising:
   determining performance metrics based on information in said performance report; and billing advertisers a particular amount based on said performance metrics.

43. A method according to claim 1, further comprising:
   providing said performance reports to interested parties, said interested parties including advertisers who sell said products identified from said catalogue, said interested parties further including sellers of product placement opportunities.

44. A method according to claim 43, wherein said sellers of product placement opportunities include production companies, studios, networks, and agencies.

45. A system according to claim 41, wherein said computer server is further programmed to perform the steps of:
   collecting and storing user information and at least a portion of said user's selections;
   generating performance reports based upon said collected information; and
   providing said performance reports to advertisers who sell said products identified from said catalogue.

46. A system according to claim 41, wherein said computer server is further programmed to perform the step of:
   performing a behavioral analysis of said information regarding selections, wherein said behavioral analysis includes analyzing demographic profiles of users with respect to product placement.

47. A system according to claim 46, wherein said step of performing a behavioral analysis comprises the steps of:
   obtaining information regarding demographic information of said users;
   obtaining information on product performance in keyword searches made by said users;
   obtaining information on product performance in product categories as provided by said users;
   obtaining information on product impressions as made by said users;
   obtaining information on click-throughs as made by said users; and obtaining information on online purchases as made by said users.

48. The system of claim 41, wherein said visual indicators are images of the entertainment productions including the products.

49. The system of claim 41, wherein generating said performance reports further includes merging data associated with product placement exposure with data associated with on-line activity concerning the products.

50. The system of claim 41, wherein said computer server is further programmed to perform the steps of accepting a search request from said user and querying said catalogue based on said search request.

51. A method of providing product information on products featured in entertainment productions, said method comprising:
    collecting and storing user information and user selections made with respect to products identified with different types of entertainment productions on a web site that contains a catalogue of product information;
    determining information regarding selections made during a particular time period by a plurality of users accessing the web site, such information including information as to which navigation methods each of said plurality of users used to find a particular one of said products from said catalog of product information, said information including at least one of: a) names of movies, b) names of television programs, and c) names of actors and/or actresses, for which the particular one of said products is associated; and
    generating and outputting performance reports including the determined information based upon said collected information.

52. A method according to claim 51, further comprising:
    performing a behavioral analysis of said information regarding selections, wherein said behavioral analysis includes analyzing demographic profiles of said plurality of users with respect to product placement.

53. A method according to claim 52, wherein said step of performing a behavioral analysis comprises the steps of:
    obtaining information regarding demographic information of said plurality of users as provided to said web site;
    obtaining information on product performance in keyword searches made by said plurality of users on said web site;
    obtaining information on product performance in product categories as provided by said plurality of users to said web site;
    obtaining information on product impressions as made by said plurality of users to said web site;
    obtaining information on click-throughs as made by said plurality of users on said web site; and
    obtaining information on online purchases as made by said plurality of users on said web site.

54. The method of claim 51, wherein generating said performance reports further includes merging data associated with product placement exposure with data associated with on-line activity concerning the products.

* * * * *